United States Patent
Neu et al.

(10) Patent No.: US 9,126,388 B2
(45) Date of Patent: Sep. 8, 2015

(54) TRACTION SURFACE AND METHODS THEREFOR

(75) Inventors: Jason Neu, Newport Beach, CA (US); Eric Deitch, Newport Beach, CA (US)

(73) Assignee: Waxless Surfboard Systems, Inc., Westminster, CA (US)

( * ) Notice: Subject to any disclaimer, the term of this patent is extended or adjusted under 35 U.S.C. 154(b) by 401 days.

(21) Appl. No.: 13/504,442

(22) PCT Filed: Oct. 26, 2010

(86) PCT No.: PCT/US2010/054039
§ 371 (c)(1),
(2), (4) Date: May 22, 2012

(87) PCT Pub. No.: WO2011/053568
PCT Pub. Date: May 5, 2011

(65) Prior Publication Data
US 2012/0225249 A1 Sep. 6, 2012

Related U.S. Application Data

(60) Provisional application No. 61/254,766, filed on Oct. 26, 2009, provisional application No. 61/354,317, filed on Jun. 14, 2010.

(51) Int. Cl.
*B32B 3/30* (2006.01)
*C08J 7/04* (2006.01)
*B29C 59/02* (2006.01)

(52) U.S. Cl.
CPC . *B32B 3/30* (2013.01); *B29C 59/02* (2013.01); *C08J 7/042* (2013.01);
(Continued)

(58) Field of Classification Search
CPC ........ B32B 3/30; B29C 59/02; B29C 59/026; B29C 2059/027; B29C 2059/023; A47K 3/002; A43B 13/22; B63B 35/7936; Y10T 428/24355; Y10T 428/24471
USPC ............................ 428/141, 155; 264/162, 293
See application file for complete search history.

(56) References Cited

U.S. PATENT DOCUMENTS 3,221,873 A  12/1965 Bowes
4,625,344 A  12/1986 Howard
(Continued)

FOREIGN PATENT DOCUMENTS

DE  4127973  11/1992
GB  1096116  12/1967
(Continued)

OTHER PUBLICATIONS

"Surface roughness profile parameters." http://www.phase2plus.com/surfaceroughnesstesters/profile-parameters.htm. accessed: Dec. 23, 2014.*
(Continued)

*Primary Examiner* — Maria Veronica Ewald
*Assistant Examiner* — Nancy Johnson
(74) *Attorney, Agent, or Firm* — Fish & Tsang LLP

(57) ABSTRACT

Devices and methods are contemplated in which a plurality of microfractures are generated on the surface of an article to so generate a non-abrasive surface having a COF of at least 0.6. Most preferably, the surface is the surface of a transparent polymer and is the surface is structured to allow high-resolution display of an image that is disposed on a surface opposite the surface with the microfractures. Consequently, numerous anti-slip products with such surfaces are contemplated.

18 Claims, 6 Drawing Sheets

(52) U.S. Cl.
CPC .... *B29C 2059/023* (2013.01); *B29C 2059/027* (2013.01); *C08J 2369/00* (2013.01); *Y10T 428/24355* (2015.01); *Y10T 428/24471* (2015.01)

(56) References Cited

U.S. PATENT DOCUMENTS

| | | | |
|---|---|---|---|
| 5,444,106 | A | 8/1995 | Zhou et al. |
| 6,014,779 | A | 1/2000 | Lindholm |
| 6,353,943 | B1 | 3/2002 | Stevens |
| 6,946,182 | B1 | 9/2005 | Allgeuer |
| 6,946,183 | B2 | 9/2005 | Malpass et al. |
| 7,152,256 | B1 | 12/2006 | Roberts |
| 7,520,003 | B2 | 4/2009 | Meyers et al. |
| 7,803,725 | B2 | 9/2010 | Payne et al. |
| 2002/0187315 | A1* | 12/2002 | Tanel et al. ................ 428/204 |
| 2005/0271847 | A1* | 12/2005 | Antonini ..................... 428/40.1 |
| 2007/0148409 | A1* | 6/2007 | Rios et al. .................... 428/167 |
| 2008/0216228 | A1 | 9/2008 | Bonanno |
| 2008/0249207 | A1 | 10/2008 | Whiteley et al. |
| 2009/0162651 | A1 | 6/2009 | Rios et al. |
| 2010/0107304 | A1* | 5/2010 | Matsunobu et al. ............. 2/167 |

FOREIGN PATENT DOCUMENTS

| | | |
|---|---|---|
| GB | 1141073 | 1/1969 |
| JP | 2008055755 | 3/2013 |
| WO | 87/00019 | 1/1987 |
| WO | WO 2008123356 A1 * | 10/2008 |

OTHER PUBLICATIONS

Wetfeethawaii, "VersaTraction", http://wetfeethawaii.blogspot.com/2009/04/versa-traction.html, screen shot dated Dec. 13, 2010.

"Clear Grip Surfboard Traction" AM System, http://www.amsystem.us/surfboard_traction.html, screen shot dated Dec. 13, 2010.

* cited by examiner

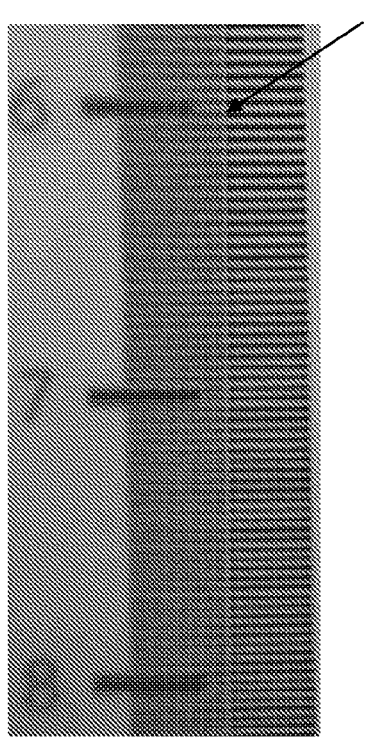
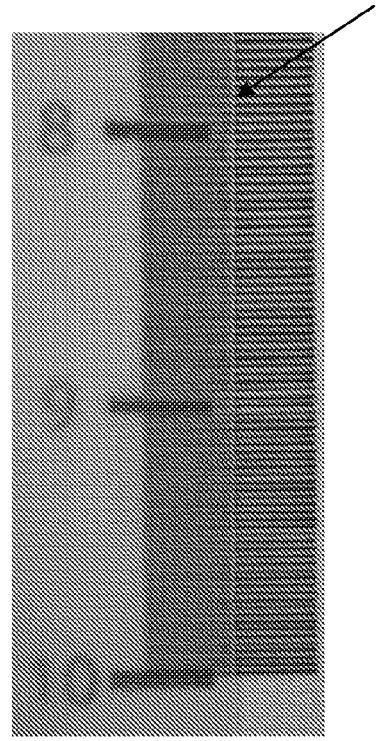
Figure 1D Figure 1E
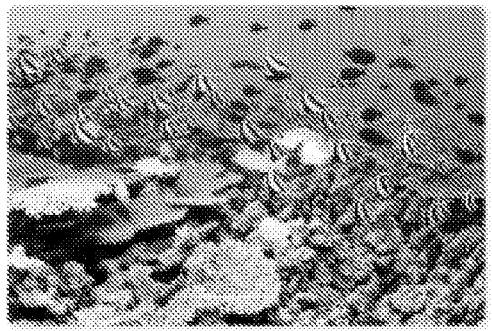
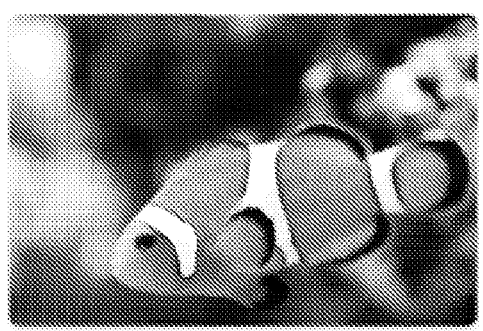
Figure 2
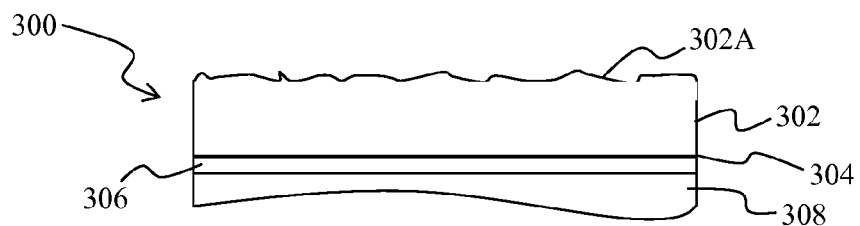
Figure 3

TRACTION SURFACE AND METHODS THEREFOR

This application claims priority to our U.S. provisional patent application Ser. Nos. 61/254,766, filed Oct. 26, 2009, and 61/354,317, filed Jun. 14, 2010.

FIELD OF THE INVENTION

The field of the invention is traction surfaces and devices, uses, and methods therefor, and especially traction surfaces with high-resolution images.

BACKGROUND OF THE INVENTION

Traction of surfaces, and especially of wet surfaces is often critical to safety in numerous environments, and many devices and methods are known in the art to increase traction. Most of the known devices and methods will fall into one of three conceptually different classes. The first class can be characterized as devices having relatively large surface modifications to thereby trap a portion of a foot or to provide a significant curvature of the surface to reduce sliding motion. For example, DE 41 27 973 teaches a bath tub mat with large indentations that engage at least a portion (typically heel) of a foot. Similarly, U.S. Pat. No. 6,014,779 teaches surfaces with large rounded nodules and drain channels, and US2008/0216228A1 teaches a compressible top layer made from soft foam material with channels and raised elements to drain water. Similarly, U.S. Pat. No. 5,494,729 teaches a substantially non-slip, non-abrasive surface that has polysulfide coating layer with relatively large solid elastomer particles.

While such devices and methods typically reduce the incidence of standing water, and with that the risk of sliding, grooves or otherwise shaped recesses will typically lead to puddling of water. Moreover, such surfaces are almost entirely unsuitable for most commercial and sporting uses. Still further, traction of such surfaces will decrease when the surface is wet, and soap or other detergents will often negate all benefits of such macro-structured surfaces.

The second class can be characterized as devices having relatively small and abrasive surface modifications. For example, GB 1141073 teaches multiple enamel layers that fuse to form a friction surface where refractory granules form an abrasive layer in the final product. Alternatively, sand or other abrasive materials can be added as a friction layer in a polymeric carrier, which may be overlaid with a plastic layer as taught in U.S. Pat. No. 4,625,344 and WO 87/00019. Unfortunately, such devices typically exhibit significant wear and tend to lose friction relatively fast. Worse yet, such surfaces often lead to abrasive injuries, especially where the friction layer is not covered. On the other hand, where the friction layer is covered with a polymer layer to reduce injury, most of the benefits tend to disappear, especially when the surface is wet.

To overcome difficulties associated with plastic surfaces, a third class of devices employs cloth or other textile materials to increase friction as, for example, described in U.S. Pat. Nos. 6,353,943 and 6,946,183. While such devices typically have desirable friction characteristics when wet, retention of such devices is more difficult. Moreover, such devices can often not be retained in wet state for prolonged periods of time without cleaning as the wet textile materials tend to accumulate mold very quickly.

Alternatively, non-slip materials can be temporarily applied to a surface as described, for example, in WO94/19414 where mixtures of a polymer and a petroleum or synthetic wax or silicone are applied to a surface. To increase retention and friction of the material, one or more tackifier agents can be, especially where water is present. While such compositions typically retain their tackiness in the wet state due to their generally hydrophobic nature, they will often attract soil and other undesirable items, especially over prolonged use. Moreover, such surface modification is often not practical, especially in bath tubs, showers, or public places (e.g., deck of a boat or jet ski).

Moreover, and regardless of the manner of increasing traction, all or almost all of the currently known traction devices fail to provide a simple and cost-effective option to include a decorative finish that is protected from the user and environment, let alone a customizable finish using high-resolution photographs or digital image files. Thus, even though numerous devices and methods for increasing friction are known in the art, all or all of them suffer from one or more disadvantages. Consequently, there is still a need to provide improved methods and devices that are customizable, and have excellent traction, even in wet environments.

SUMMARY OF THE INVENTION

The present invention is directed to devices and methods of increasing slip resistance and more particularly to devices and methods in which in at least one surface a plurality of microfractures are generated. Most typically, such surfaces are non-abrasive and provide excellent slip resistance as evidenced by multiple tests. Remarkably, surfaces according to the inventive subject matter allow for high-resolution display of images disposed underneath the treated surface. Moreover, it was observed that the slip resistance increased when the surface was wetted with water, water and detergent, and even oil.

In one aspect of the inventive subject matter, an article comprises a transparent polymeric layer having a non-abrasive microfractured first surface and a second surface opposite the first surface, wherein the microfractured first surface has a structure that allows for optical resolution of an image coupled to the second surface of equal or less than 1 mm. Most typically, the microfractured first surface imparts a coefficient of friction (COF) of at least 0.6.

In especially preferred aspects of the inventive subject matter, the polymeric layer comprises a polymer film having a thickness of less than 1 mm, and is preferably manufactured from a thermoplastic polymer. it is further generally preferred that the microfractured first surface has a plurality of micro-ablations and micro-crevices. Most typically, the optical resolution of the image coupled to the second surface is equal or less than 0.3 mm, and/or the coefficient of friction (COF) is at least 0.75.

It is further preferred embodiments, an image is coupled to or printed onto the second surface, and an adhesive layer may be coupled to the image. Moreover, an elastomer may be coupled to the second surface, and an image layer and/or an adhesive layer may be disposed between the second surface and the elastomer. Among many other uses, it is contemplated that the article is configured as a structured traction pad for sport equipment, a traction pad for marine use, or a traction pad for residential or public aquatic use.

Viewed from a different perspective, contemplated articles have a first polymer surface with a plurality of microfractures arranged in a random pattern, wherein the first surface has an average unevenness of equal or less than 0.1 mm, and wherein the article has a coefficient of friction (COF) of at least 0.6 when measured on the first surface. While not limiting to the inventive subject matter, it is generally preferred that the first polymer surface is a structured surface (e.g., having a random shape, a geometric shape (open shape like waves, or closed shape like diamonds), or having an intersecting pattern (cross-hatched, weave pattern, etc). As noted before, it is generally contemplated that the microfractures comprise micro-ablations and/or micro-crevices. In further particularly preferred articles, the article has a coefficient of friction (COF) of at least 0.75 when measured on the first surface.

Consequently, the inventor also contemplates a non-abrasive article comprising a first polymer surface with a coefficient of friction (COF) of at least 0.6, wherein the first surface has a structure that provides increased COF in the presence of water on the first surface relative to a persons foot contacting the first surface. Most typically, the first polymer surface has an average surface unevenness of equal or less than 0.1 mm, and the structure comprises a plurality of microfractures. It is still further preferred that the article is transparent and has a structure effective to allow for optical resolution of an image coupled to the second surface of equal or less than 0.5 mm.

In yet another aspect of the inventive subject matter, a method of increasing slip resistance of a surface of an article comprises a step of generating a plurality of microfractures in the surface at a density sufficient to thereby impart a coefficient of friction (COF) of at least 0.6. Most preferably, the microfractures are generated by impacting the surface with a plurality of micro-impactors to form a plurality of micro-ablations and micro-crevices in random orientation in the surface.

Various objects, features, aspects and advantages of the present invention will become more apparent from the following detailed description of preferred embodiments of the invention.

BRIEF DESCRIPTION OF THE DRAWING

FIGS. 1A-1E are examples illustrating the high resolution feature of various traction surfaces according to the inventive subject matter.

FIG. 2 depicts exemplary bathmats with traction surfaces and high-resolution images according to the inventive subject matter.

FIG. 3 schematically depicts an exemplary composite article (not to scale) with a traction surface, high-resolution image, adhesive layer, and base material according to the inventive subject matter.

DETAILED DESCRIPTION

Figure 1A:
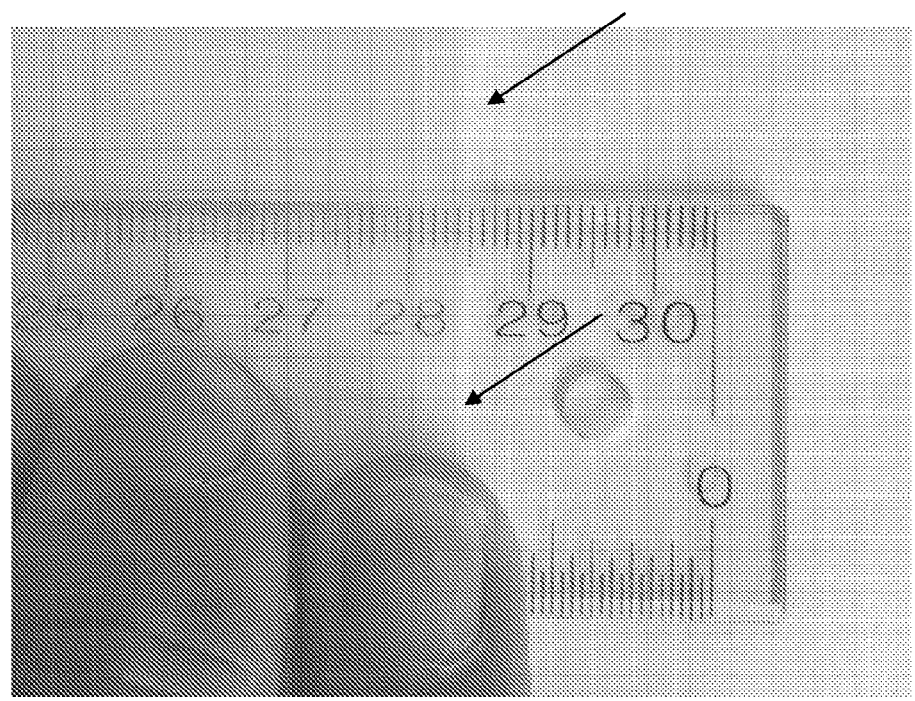
Figures 1B, 1C:
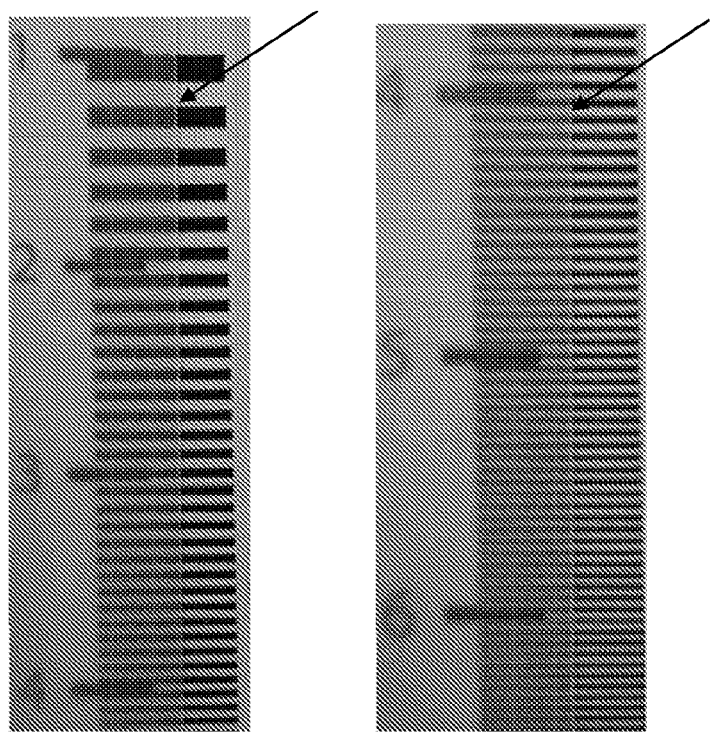

The inventors have discovered various traction devices and methods that overcome all or almost all of the problems associated with heretofore known traction devices and methods. In especially preferred aspects, the inventors have discovered that traction materials can be prepared that are non-abrasive, have remarkably high slip resistance (especially relative to a bare human foot) when the material is wet, and/or that provide high-resolution for images disposed underneath the surface of the traction device. Moreover, traction of such devices is not significantly reduced when detergent, or even oil is present. Such remarkable properties are achieved by generation of microfractures in at least one surface of the traction device, typically in random orientation and at an average size less than 1 mm, wherein that surface may or may not be structured.

Thus, in especially preferred aspects of the inventive subject matter, a traction device has a transparent polymeric layer having a non-abrasive microfractured first surface and a second surface opposite the first surface, wherein the microfractured first surface has a structure effective to allow for optical resolution of an image coupled to the second surface of equal or less than 1 mm, and more typically equal or less than 0.5 mm, and most typically equal or less than 0.25 mm, and wherein the microfractured first surface imparts a coefficient of friction (COF) of at least 0.6. Viewed from a different perspective, a traction device has a polymer surface with a plurality of microfractures arranged in a random pattern therein, wherein the first surface has an average unevenness of equal or less than 1.0 mm, more typically equal or less than 0.5 mm, and most typically equal or less than 0.1 mm, and wherein the article has a coefficient of friction (COF) of at least 0.6 when measured on the first surface. Due to the specific surface structure of the traction device, it therefore also contemplated that the device is or comprises a non-abrasive article having a polymer surface with a coefficient of friction (COF) of at least 0.6, wherein the surface has a structure that provides increased COF in the presence of water on the surface (especially relative to a persons foot contacting the first surface).

While not wishing to be bound by any theory or hypothesis, it is contemplated that the microfractures, and especially the edges of micro-depressions, micro-ablations, and/or micro-crevices will not only provide in their totality a significant quantity of relatively sharp but non-abrasive engagement surfaces, but also help in disruption of a continuous water or other fluid film that would otherwise form a low-traction layer. Thus, it should be appreciated that slip resistance of a surface of an article can be increased by generating a plurality of microfractures in the surface, most preferably at a density sufficient to impart a coefficient of friction (COF) of at least 0.6, more preferably at least 0.65. Unless stated otherwise, all COF values are based on determination using the test protocol suitable for analysis with a Brungraber MkII PIAST (Portable Inclinable Articulated Strut Tribometer; following ASTM F1677) and/or for analysis with an English XL VIT Tribometer (following ASTM F1679). Alternative COF measures can be obtained using the Tortus Model Mk 2 (following AS/NZS 4586: 2004 Slip resistance classification of new pedestrian surface materials).

As used herein, the term "microfracture" in a surface refers to a discontinuity in a portion of the surface such that an edge is created in the surface. In most cases, discontinuity can be characterized as a micro-ablation (e.g., flaking off of a portion of the surface with concomitant creation of an edge) a micro-crevice (e.g., tear or breakage extending into the material with microfractures with concomitant creation of an edge), and/or a micro-depression (e.g., localized impact area generated by localized compaction of the material with microfractures with concomitant creation of an edge). Typically, the microfractures will not extend across the material, but will be limited to the surface. In most cases, the average depth of a microfracture will be less than 0.1 mm, more typically less than 0.07 mm, and most less than 0.05 mm.

As further used herein, the term "surface unevenness" refers to character of the surface not taking into account the unevenness created by the microfractures. For example, surface unevenness may be due to the manner of manufacture of the material or may be intentionally generated (e.g., by stamping, hot-pressing, etc.) prior to generation of the microfractures. Among other things, surface unevenness may have a shape of a random pattern (e.g., waves, hills-and-valleys, etc., which may be present in repeating units) or may have a regular pattern. Thus, surface unevenness may be part of an intentionally generated structured surface, wherein the structured surface may have random shape (e.g., similar to cathedral glass), a geometric shape (e.g., open shapes like waves, or closed shapes like honeycomb or diamond patterns), and/or intersecting patterns (cross-hatched patterns, weave patterns, etc). Therefore, in most cases, the average surface unevenness will be equal or less than 5 mm, more typically equal or less than 2.5 mm, even more typically equal or less than 1.0 mm, and most typically equal or less than 0.5 mm (e.g., less than 0.3 mm, or less than 0.1 mm).

As still further used herein, the term "non-abrasive" in conjunction with the surfaces presented herein is intended to express that the surfaces are non-abrasive to human skin under ordinary conditions. For example, a surface is considered non-abrasive when the surface can be moved at a speed of 1 foot per second across human skin (e.g., forearm) at a contact force of 50N without causing injury or severe irritation.

As also used herein, the term "optical resolution of an image" refers to the ability to perceive with the unaided eye two distinct lines (or other image elements) on the image as two distinct lines (or other image elements) when viewed through the microfractured surface, wherein the distance between the two lines (or other image elements) is specified in millimeters. In most aspects, the layer and the microfractured first surface will have a structure effective to allow for optical resolution of an image coupled to the second surface of equal or greater than 0.01 mm, and more typically equal or greater than 0.05 (and in some cases equal or greater than 0.1 mm), but equal or less than 1 mm, and more typically equal or less than 0.5 mm. Thus, it should be noted that the term "equal or less than" in conjunction with a specified distance does not include distances that can not be resolved by the human unaided eye.

In particularly desirable aspects, contemplated devices can be readily modified by applying a print or other colored material to the material on a surface opposite the surface having the microfractures. Prints may be applied directly by printing on the surface or by contacting the surface with a printed material. Alternatively, any other material can also be applied to the surface (e.g., reflective paint or reflective tape, newspaper clippings, plant materials, sand, sea shells, etc.), preferably (but not necessarily) by use of an adhesive. Similarly, it is also contemplated that a user may paint or draw a picture onto the surface. Thus, it should be appreciated that the image or other decorative item on the device is protected from moisture, abrasion, and other environmental influences by the microfractured surface and underlying material. It should therefore be appreciated that contemplated devices may be configured into any device or article that would benefit from a surface with increased slip reduction. For example, suitable devices or articles may include traction pads and surfaces for marine use, sport equipment, commercial safety equipment, and/or residential or public aquatic use. Thus, and among many other examples, devices and articles may be configured as (optionally adhesive) mats, strips, or laminated products (e.g., laminated to EVA polymer or other soft or shock-absorbing material). Most typically, contemplated devices and articles will further include a pressure sensitive adhesive to facilitate application and removal of the device. Remarkably, it should be noted that the traction between the microfractured surface and an animate (e.g., foot or hand of a person) or inanimate object increases when water is disposed between the first surface and the object. As a further consequence of the microfractures, it should also be appreciated that now traction articles can be manufactured with heretofore unachieved optical qualities.

FIGS. 1A-1E exemplarily illustrate the remarkable resolution capability of traction surfaces according to the inventive subject matter. For example, FIG. 1A is a photograph of a slide ruler that is partially covered by a polycarbonate film, wherein the side contacting the fingertips is treated to have microfractures and wherein the opposite side is untreated. The edge of the film extending from the left side of the image towards the 28.5 cm mark is shown by the arrows. As is readily apparent, ruler markings are visible with remarkable sharpness and high clarity. FIGS. 1B-1E are photographs of segments of the resolution bar from the IOS 12233 Resolution Measurement Chart (that was printed onto 11×17) at approximately 2-fold magnification. As is readily apparent from the images, the optical resolution of the image disposed underneath the traction surface was well below 0.5 mm. In most cases, and further depending on the particular material and treatment, optical resolution can be achieved as low 0.5 mm, typically as low as 0.4 mm, more typically as low as 0.3 mm, and even as low as 0.2 mm (or even lower). Such high optical resolution is entirely unexpected, especially where the surface provides a high coefficient of traction (e.g., COF of at least 0.45, more typically at least 0.5, even more typically at least 0.6, and most typically at least 0.65).

Thus, fraction surfaces and devices can be produced in an visually attractive manner while providing substantial increase in slip resistance. Exemplary embodiments are depicted in FIG. 2, where high-resolution bathmats are shown. Devices prepared according to the inventive subject matter (typically comprising one or more polymer sheets, which may or may not be the same polymer material) will be die cut to specification for use in a particular surface, for example, a surfboard, bathtub or boat deck to provide a non-slip traction surface and to provide a desired design pattern on the surfboard, bathtub or boat deck. The so formed device typically comprises a thin sheet of a polymer (e.g., polycarbonate or acrylic polymer) and a pressure-sensitive adhesive layer on one surface. Most preferably, a removable protective layer covers the pressure-sensitive adhesive layer, while the other surface of the device incorporates an engineered microstructure that is formed on the surface to so provide the non-slip traction surface when the surface is wet or dry.

FIG. 3 schematically illustrates a typical example of a traction device according to the inventive subject matter where composite article 300 comprises a polymer film 302 having microfractured first surface 302A. An image layer 304 is disposed on the surface that is opposite the microfractured first surface 302A wherein the image layer may be directly printed on the surface or glued (or otherwise affixed) to the surface. Coupling of the polymer film and image to another material 308 (e.g., elastomer, floor elements (wood, tile, etc.)) is preferably achieved via pressure sensitive adhesive 306. However, it should be noted that the particular nature of the manner of coupling is not critical to the inventive subject matter. For example, microfractured first surface 302A may be formed directly on the material 308. Thus, it should be appreciated that the image layer and/or the adhesive 306 may be omitted.

In one especially preferred example, contemplated devices can be manufactured from a thin sheet of a polymeric material (e.g., thermoplastic), and most preferably a polycarbonate or an acrylate polymer film having a thickness of about from 0.05 inch to 0.01 inch. Of course, it should be noted that the film can be clear and transparent, colored and transparent, or translucent. Moreover, it is generally preferred that at least one side of the film has a smooth surface onto which an image (or other decorative or functional item) can be printed or otherwise positioned (e.g., a graphic, a logo, or photograph, reflective material, typically using silk screening, inkjet printing equipment, or stickers). Instead of pictures, it should be appreciated that various (preferably generally flat) objects or layers with objects, etc. may also be coupled to the smooth surface. Similarly, it is preferred that the opposite (top) surface of the film is also smooth, however, in at least some circumstances, the opposite surface may also be non-smooth or processed to be non-smooth (e.g., squares, grooves, matt finish, or various embossed patterns/logos) using various tools well known in the art (e.g., die press, roller press, stamps, etc.).

Depending on the particular use and treatment, it is contemplated that the thickness of the film may vary considerably, and that numerous thicknesses are deemed suitable for use herein. For example, where the film is placed onto an article as a decorative anti-slip device, suitable film thickness may be between 0.025 mm and 2 mm, and more preferably between 0.1 mm and 0.5 mm. On the other hand, where the film is used as a structural component, the thickness may be between 0.5 mm and 5 cm (and even more), and more typically between 1 mm and 2 cm. Of course, and as noted before, it should be appreciated that microfractures may also be imparted into an already present surface without addition of a film using the methods as presented below. Such use may be especially advantageous in an environment where a film need not be replaced or where the surface has an irregular shape that would be difficult to cover with a film.

It should be appreciated that while polycarbonate and acrylic polymer films are typically preferred, numerous alternative polymers are also deemed suitable and especially include numerous thermoplastics (infra), biodegradable plastics (e.g., starch-based polymers, polylactates, polyhydroxybutyrates, etc.), and so on. Thus, and viewed from a different perspective, suitable polymers include various acrylics, polyesters, polyamides, silicones, polyurethanes, etc., and all reasonable mixtures thereof.

Among other suitable choices, contemplated thermoplastics include acrylonitrile butadiene styrene (ABS), acrylic (PMMA), celluloid, cellulose acetate, cyclic olefin copolymer (COC), ethylene-vinyl acetate (EVA), fluoroplastics (PTFE, alongside with FEP, PFA, CTFE, ECTFE, ETFE), liquid crystal polymer (LCP), polyacetal (POM or Acetal), polyacrylates (Acrylic), polyacrylonitrile (PAN or Acrylonitrile), polyamide (PA or Nylon), polyamide-imide (PAI), polybutylene terephthalate (PBT), polycaprolactone (PCL), polyethylene terephthalate (PET), polycarbonate (PC), polyhydroxyalkanoates (PHAs), polyketone (PK), polyesters, polyethylene (PE), polyethersulfone (PES), polyimide (PI), polylactic acid (PLA), polypropylene (PP), polystyrene (PS), polysulfone (PSU), polyurethane (PU), Polyvinyl acetate (PVA), polyvinyl chloride (PVC), polyvinylidene chloride (PVDC), and styrene-acrylonitrile (SAN).

Where the polymeric film is part of a composite structure (e.g., tail pad for surfboard, padded bathmat, etc.), it is especially preferred that the polymeric film is attached (typically via adhesive) to an elastomer. Suitable elastomers include natural rubber (NR), synthetic polyisoprene (IR), butyl rubber (copolymer of isobutylene and isoprene, IIR), halogenated butyl rubbers (chloro butyl rubber: CIIR; bromo butyl rubber: BIIR), polybutadiene (BR), styrene-butadiene Rubber (copolymer of polystyrene and polybutadiene, SBR), nitrile rubber (copolymer of polybutadiene and acrylonitrile, NBR), hydrogenated nitrile rubbers (HNBR), chloroprene rubber (CR), polychloroprene, neoprene, baypren etc., EPM (ethylene propylene rubber, a copolymer of ethylene and propylene) and EPDM rubber (ethylene propylene diene rubber, a terpolymer of ethylene, propylene and a diene-component), polyacrylic rubber (ACM, ABR), silicone rubber (SI, VMQ), fluorosilicone rubber (FVMQ), fluoroelastomers (FKM, and FEPM), polyether block amides (PEBA), chlorosulfonated polyethylene (CSM), (Hypalon), and ethylene-vinyl acetate (EVA). Of course, it should be appreciated that the actual material need not be limited to elastomers, and that all alternative materials are also deemed suitable for use herein (e.g., metal, metal alloys, ceramics, wood, etc.).

While it is generally preferred that the material onto which the microfractures are formed is or comprises a polymer film, it should be appreciated that the microfractures can be generated on numerous other shapes include cylinders, spherical shapes, and irregularly shaped objects. Indeed, all shapes are deemed appropriate so long as such shapes allow generation of a micro-structured surface. Thus, the thickness of the films is not limiting to the inventive subject matter, and suitable films may have a thickness of between 10-100 micrometer, between 100-300 micrometer, between 300-1000 micrometer, and even thicker. It should be further especially noted that pre-existing surfaces may also be treated with the methods disclosed herein to so generate the traction surface (e.g., polymeric boat deck or surfboard is blasted with grit as described above). Thus, contemplated methods allow manufacture of not only temporary traction surfaces by applying such films, but also allow permanent modification of existing surfaces to increase fraction.

It is further preferred that the bottom surface of film includes a pressure sensitive adhesive layer (typically on top of the image or other graphic material) to ensure permanent or semi-permanent adhesion of the bottom surface of the film to the surface on which a non-slip traction surface is desired. Of course, numerous alternative adhesives are also deemed suitable and all known adhesives and adhesive compositions are considered appropriate for use herein. Where desired or needed, a removable sheet material is added on the bottom surface of the adhesive layer (e.g., paper or other type sheet material) to protect the adhesive layer prior to use so that the adhesive layer along with the non-slip traction film may be transported to the surface where the non-slip traction pad is needed. Of course, it should be recognized that the traction devices described herein may be shaped to any final form via all known manners (e.g., die cut using a stamping die).

In especially preferred aspects of the inventive subject matter, the micro-structured friction surface is created in a (typically non-ablative) micro-impaction process. In a particularly preferred example, abrasive cleaning/sandblasting equipment and metal oxide grit is used, typically using direct pressure and siphon feed systems. Among other suitable choices, the preferred impact medium is commercially available aluminum oxide grit, typically with primary grit sizes of #60, #70, #80, #90, and/or #100. Other suitable aluminum oxide grit sizes include those from a macro grit #8 on the large end to a small grit #220 on the fine end. Under many conditions, such sizes will produce a micro-structured surface with significantly enhanced friction.

Most significant process parameters for devices contemplated herein are the air pressure used to convey the media, the size of grit used, and the distance from which the grit is sprayed onto the film. The following Tables 1 and 2 exemplarily illustrate sizes of grits used herein where the grit was delivered to the film at a pressure of between 25-100 psig at a distance of between about 1 inch to about 6 feet.

TABLE 1

| Macro Grit | Inches | | | Microns | | |
| --- | --- | --- | --- | --- | --- | --- |
| | Average | Maximum | Minimum | Average | Maximum | Minimum |
| # 60 | 0.010 | 0.0160 | 0.0065 | 254 | 406 | 165 |
| # 70 | 0.008 | 0.0130 | 0.0050 | 203 | 330 | 127 |
| # 80 | 0.0065 | 0.0115 | 0.0040 | 165 | 292 | 102 |
| # 90 | 0.0057 | 0.0095 | 0.0350 | 145 | 241 | 89 |
| # 100 | 0.0048 | 0.0080 | 0.0025 | 122 | 203 | 63 |

TABLE 2

| Macro Grit | Inches | | | Microns | | |
| --- | --- | --- | --- | --- | --- | --- |
| | Average | Maximum | Minimum | Average | Maximum | Minimum |
| # 36 | 0.019 | 0.030 | 0.012 | 483 | 762 | 305 |
| # 46 | 0.014 | 0.022 | 0.0095 | 356 | 559 | 241 |
| # 54 | 0.012 | 0.0195 | 0.0080 | 305 | 495 | 203 |

It should further be appreciated that the grit material need not be limited to aluminum oxide, but may also include various silicates and other minerals, metals, and metal oxides, and all reasonable combinations thereof. Where thermal issues are encountered, frozen CO2 grit may be employed. Likewise, the pressure to deliver the grit to the surface to be treated may vary considerably, and suitable pressures will typically lie in the range of 10-500 psig, and more typically between 20-80 psig at a distance between the nozzle and polymer surface of between 0.1 inch and several feet, and more typically 10-50 inches. Suitable pressures may be determined by the person of ordinary skill in the art without undue experimentation.

Furthermore, it should be noted that where contemplated treatment processes produce excessive or undesirable heat in the treated material, the material can be cooled on a cooling table or other surface, typically to a temperature of 60° C. and below. Alternatively, solid CO2 grit may also be employed for temperature control. On the other hand, it should also be noted that (pre-)heating of the surface that is to be treated may be advantageous, especially where the material is a thermoplastic material. Such preheating may advantageously allow reduction of pressure or allow for modification of the so generated microfractured surface.

Regardless of the manner of grit delivery, it is generally preferred that the microfractured surface is produced in a non-ablative manner. Thus, the loss of material (on a weight basis) in non-ablative microfracturing after grit delivery and formation of the microfractures is preferably less than 15%, more preferably less than 10%, even more preferably less than 5%, and most preferably less than 3%. Thus, and viewed from a different perspective, preferred methods of manufacture produce a surface with microfractures by local impaction and/or densification of the surface.

In still further alternative methods, the microfractured surface may also be prepared using different manufacture processes, and especially preferred processes include stamping (e.g., using a roller or a die having a micro-structured surface). Alternatively, various ablative methods are also deemed suitable for use herein, and especially preferred alternative methods include laser- or ultrasound-based micro-ablation, and dissolution of a dissolvable phase in the surface that is to be treated. Such dissolution is preferably performed using a solvent in a process similar to chemical etching. Alternatively, a photolithographic process may be employed to produce the microfractured surface, and it yet further contemplated aspects, heat treatment of the surface is contemplated where the surface comprises a plurality of micro-structured thermolabile elements. In still further contemplated alternative methods, the surface may be pretreated with an ultra-cold medium (e.g., liquid nitrogen) and then impacted with a roller, die, or grit.

Figure 4A:
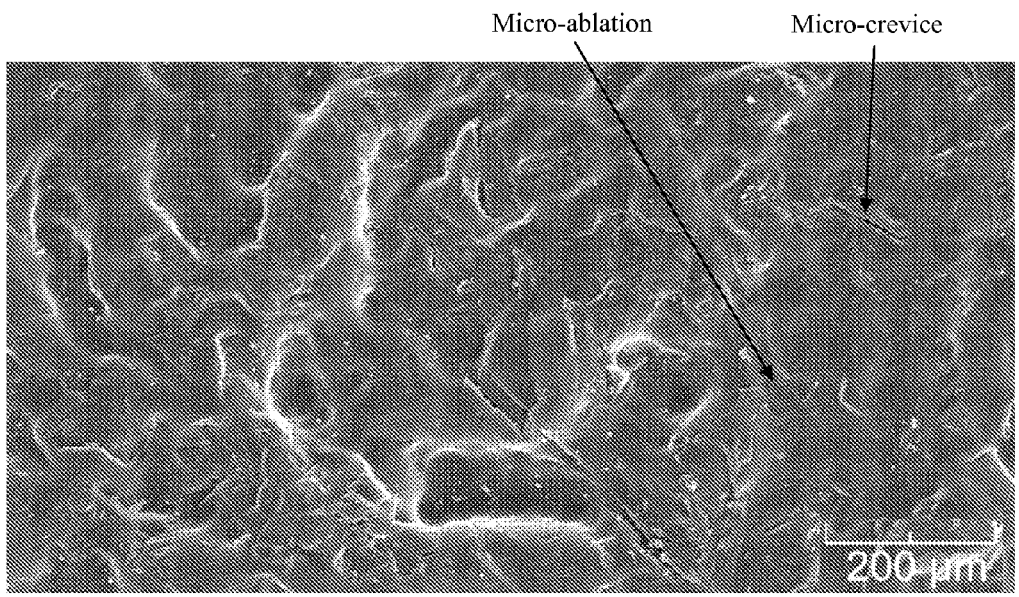
FIGS. 4A-4F are scanning electron micrographs of a polymer material before and after formation of the traction surface.
Figure 4B:
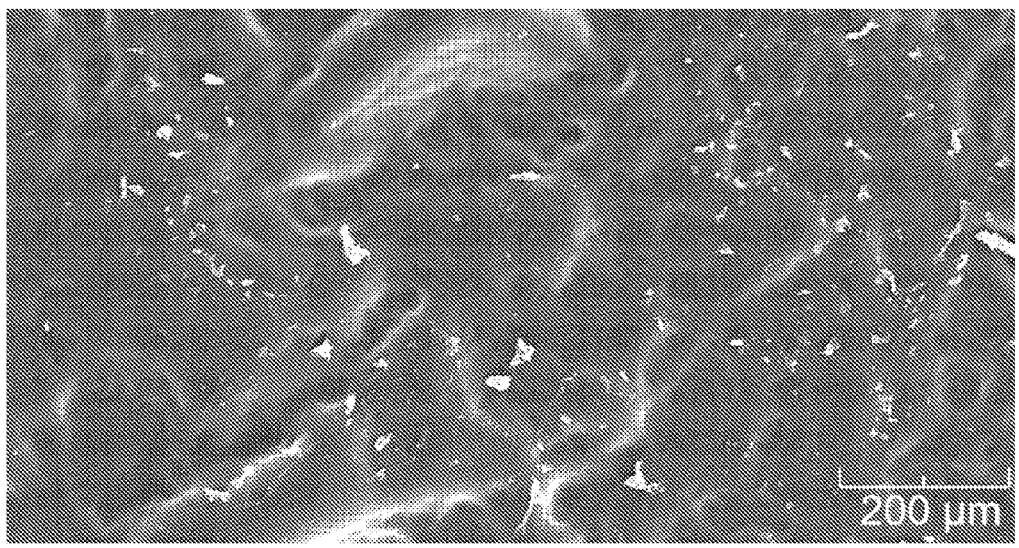
Figure 4C:
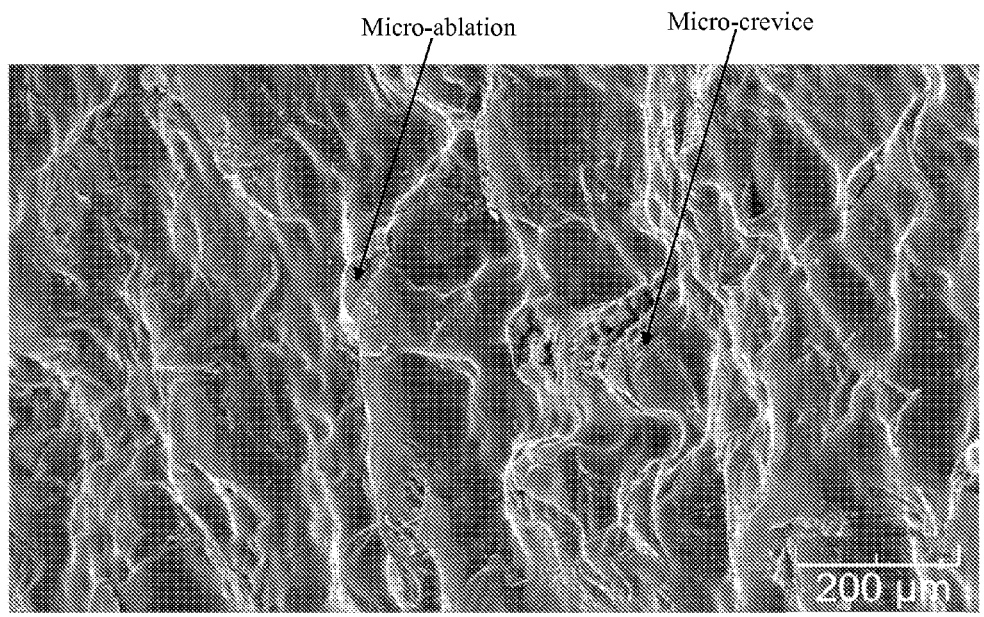
Figure 4D:
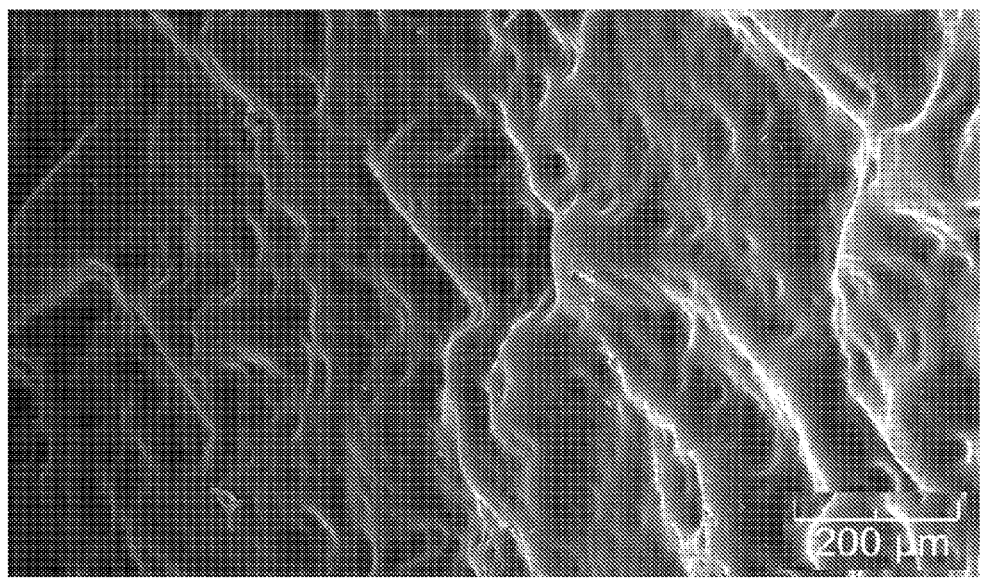

FIGS. 4A-4F depict scanning electron micrographs of sections of a polycarbonate film before and after treatment with metal oxide grit. More particularly, FIG. 4A is an SEM image of a treated surface at 100-fold magnification showing numerous micro-crevices and micro-ablations. FIG. 4B depicts the same material at 100-fold magnification before treatment. As is readily apparent, no microfractures are present. It should also be noted that the treated surface of the polycarbonate film of FIGS. 4A-F also had a random structured surface (see especially FIG. 4F), and that the average surface unevenness was substantially not affected by the microfractures. FIGS. 4C and 4D provide a 45 degree angled view of the treated and untreated surfaces, respectively, at 100-fold magnification. Once more, it is readily apparent that the micro-ablations, micro-crevices, and micro-depressions in their totality provide a large measure of engagement ridges that are not found in the untreated surface.

Figure 4E:
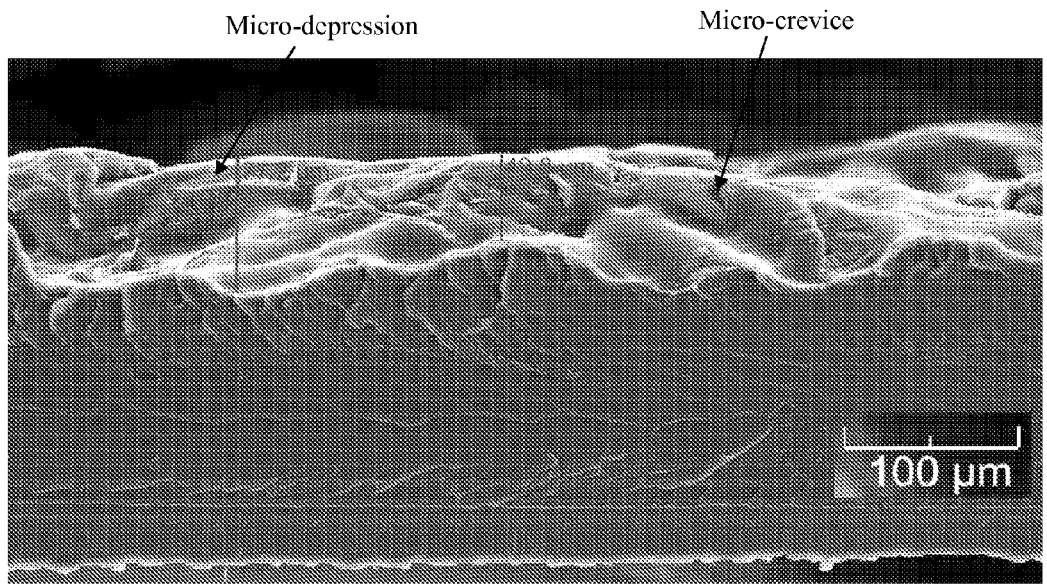
Figure 4F:
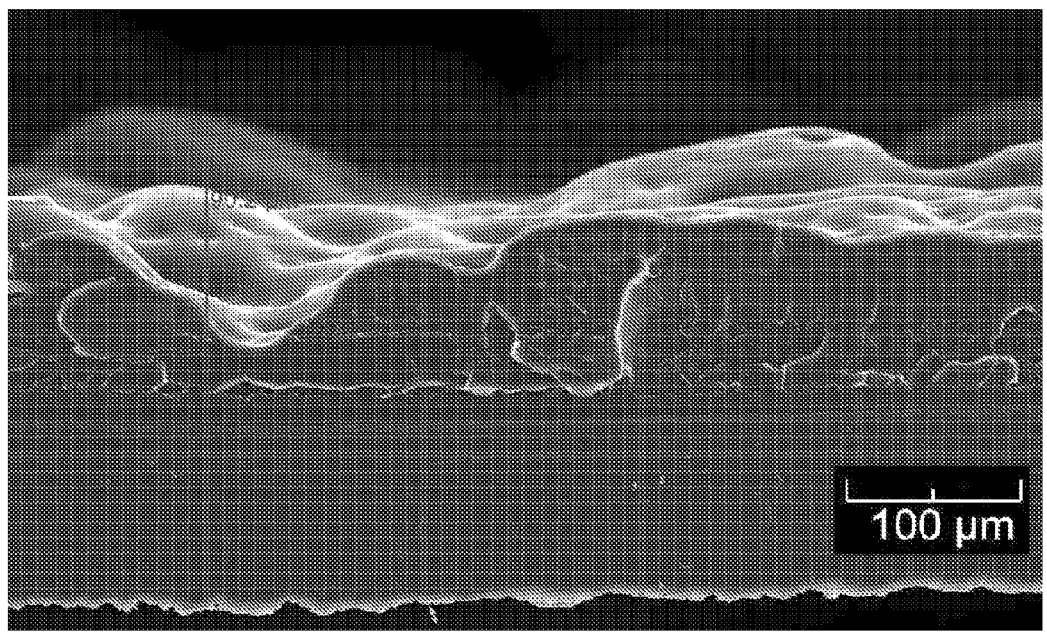

FIGS. 4E and 4F show cross sectional views at 200-fold magnification of treated and untreated films, respectively. Once more, the difference between treated and untreated surface it is readily apparent. It should be appreciated that the average surface unevenness on the treated side (was due to the random structuring of the starting material) was substantially unaffected, but that the plurality of micro-fractures provide a plethora of engagement ridges. In most cases, the average length of micro-fractures is between 0.02 and 0.4 mm, and more typically between 0.05 and 0.3 mm. Similarly, the average area of a micro-ablation and/or micro-depression is between 1 and 0.5 $\mu m^2$, and more typically between 5 and 0.2 $\mu m^2$. The average depth of the microfractures is typically between 0.5 and 50 $\mu m$, more typically between 1 and 30 $\mu m$, and most typically between 1 and 10 $\mu m$.

Figure 5:
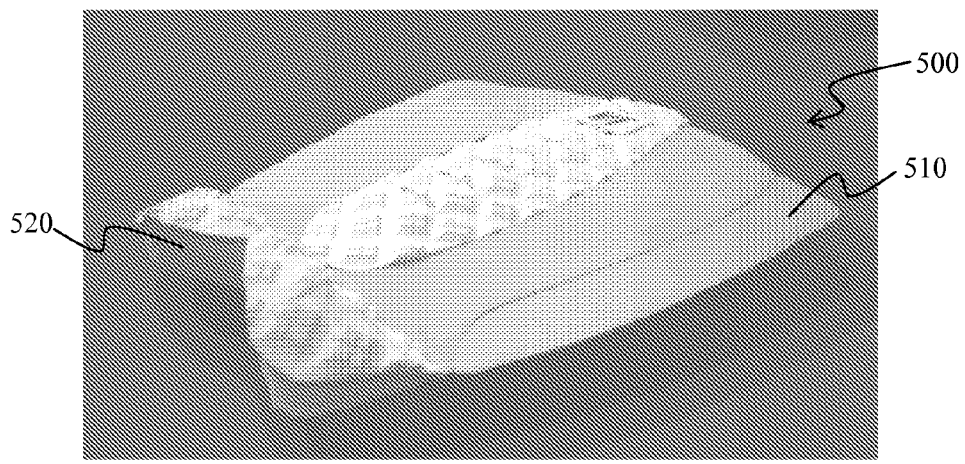
FIG. 5 is a photograph of one example of a composite product comprising a traction surface according to the inventive subject matter.
Figure 6:
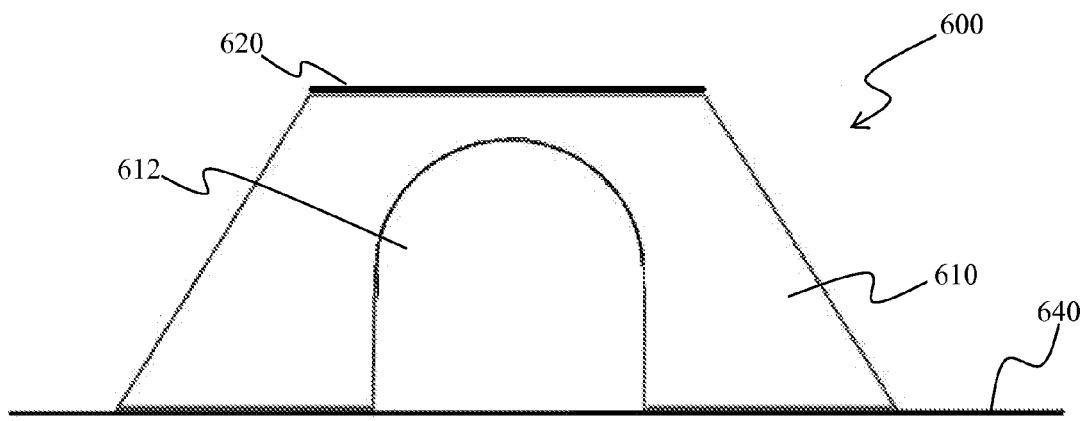
FIG. 6 is a schematic illustration of another example of a composite product comprising a traction surface according to the inventive subject matter.

Films with thusly prepared surfaces will be particularly useful to impart anti-slip or increased traction to various articles of manufacture, and FIG. 5 depicts one exemplary tail pad 500 for a surf board in which a shaped EVA elastomer portion 520 is partially covered by traction surface 510. In another example, as depicted in FIG. 6, a safety step 600 is formed from a hard rubber base 610 with a longitudinal channel 612. Traction film 620 is coupled to the base 610, typically via an adhesive (not shown). Additional adhesive can be used to adhere step 600 to floor 640 (e.g., concrete floor).

EXAMPLES

The following examples are provided as representative (but not exhaustive) methods and results for improved traction surfaces. All materials below are based on an acrylic film or a polycarbonate film having one random structured surface and an opposing smooth surface. Tests were conducted in accredited testing facilities according to industry standard protocols as described in more detail below. Microfractures were imparted into one side of the film by impaction with aluminum oxide grit #80 at a pressure of 20-80 psig at a distance of about 3 feet.

US ASTM Dry Friction Rating: Samples were prepared and mounted according to code and tribometer manufacturer's instructions. The test protocol for analysis with the Brungraber Tribometer followed ASTM F1677, and the test protocol for analysis with the English Tribometer followed ASTM F1679. The mean results for both tests were 0.68. Classification range 0-0.7

Dry Floor Friction Testing and Rating: A sample was mounted to a 1200×600×12 mm particle board for testing. The sample was washed with a pH neutral detergent, rinsed with tap water and dried. The test protocol for analysis with the Tortus Floor Friction Tester followed AS/NZS 4586: 2004 Slip resistance classification of new pedestrian surface materials using a Tortus Floor Friction Tester. Equipment used was a Tortus Model Mk 2 with Slider 96 (Four S). The mean value of 2 independent tests (rounded to 0.05) was 0.80 (COF). Classification ranges F>0.4; G<0.4; the surface was thus classified as category F.

Wet slip resistance: Wet slip resistance testing used the wet pendulum method. A sample was mounted to a 1200×600×12 mm particle board for testing, and the sample was washed with a pH neutral detergent, rinsed with tap water and dried. Test standard was AS/NZS 4586: 2004 Slip resistance classification of new pedestrian surface materials using a Stanley Skid Resistance Tester (Pendulum) with Slider 96 (Four S). the mean value of 5 independent tests was 57 (expressed as BPN). Classification ranges V>54; W 45-54 X 35-44; y 25-34; Z<25; the surface was thus classified as category V.

Oil-Wet Ramp: A sample was mounted to a 1200×600×12 mm particle board for testing, and the sample was washed with a pH neutral detergent, rinsed with tap water and dried. Test standard was AS/NZS 4586-2004 Slip resistance classification of new pedestrian surface materials using standard ramps. The mean overall acceptance angle was determined to be 22.4°; Classification ranges 6° to 10°: R9; Over 10° to 19°: R10; Over 19° to 27°: R11; Over 27° to 35°: R12; Over 35°: R13; the surface was thus classified as category R11.

Wet/Barefoot Ramp: Sample preparation substantially similar to that for oil wet ramp above; Test standard was AS/NZS 4586:2004 Slip resistance classification of new pedestrian surface materials. The mean angle of inclination was determined to be 21°; the surface was classified as category B.

Surfaces with moderate microfracturization (e.g., used in bathmats) provided the following results in comparison with a terrazzo tile sample:

Brungraber Mark III Testing: Test protocol followed ASTM F-1677 test method under both dry and wet conditions. Configuration of the Brungraber Mark III in direction of travel: north (n), east (e), south (s), west (w). Terrazzo Tile Sample without traction surface: Dry results 0.76 (n), 0.76 (w); average=0.76; Wet: 0.13 (n), 0.13 (w); average=0.13; Terrazzo with traction surface: Dry: 0.87(n), 0.88 (w); average=0.88; Wet: 0.41 (n), 0.32 (w) 0.35 (s); average=0.36.

English XL Testing: Test protocol followed ASTM F-1679 test method under both dry and wet conditions. The following slip test results were obtained using the English XL Variable Incidence Tribometer. Configuration of the English XL in direction of travel: north (n), east (e), south (s), west (w). Terrazzo Tile Sample without traction surface: Dry: not recorded, Wet: 0.30 (n); Terrazzo with traction surface: Dry: 1.0 (n), Wet: 0.66 (n), 0.70 (w); average=0.68.

Thus, specific embodiments and applications of methods of traction surfaces and methods therefor have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. An article comprising:
    a transparent polycarbonate or acrylic polymeric layer having a non-abrasive micro-impacted microfractured first surface having a plurality of discontinuities, wherein the plurality of discontinuities extend into the layer and create a plurality of respective edges, and a second surface opposite the first surface;
    wherein the layer and the microfractured first surface have a structure effective to allow for optical resolution of an image coupled to the second surface of equal or less than 1 mm; and
    wherein the microfractured first surface imparts a coefficient of friction (COF) of at least 0.6, and wherein the COF is determined per ASTM F1677 or ASTM F1679.

2. The article of claim 1 wherein the polymeric layer comprises a polymer film having a thickness of less than 1 mm.

3. The article of claim 1 wherein the polymeric layer comprises a thermoplastic polymer.

4. The article of claim 1 wherein the microfractured first surface has a plurality of micro-ablations and micro-crevices.

5. The article of claim 1 wherein the optical resolution of the image coupled to the second surface is equal or less than 0.3 mm.

6. The article of claim 1 wherein the coefficient of friction (COF) is at least 0.65.

7. The article of claim 1 wherein an image is coupled to or printed onto the second surface, and optionally an adhesive layer coupled to the image.

8. The article of claim 1 further comprising an elastomer coupled to the second surface, and optionally at least one of an image layer and an adhesive layer disposed between the second surface and the elastomer.

9. The article of claim 8 configured as a structured traction pad for sport equipment.

10. The article of claim 1 configured as a traction pad for marine use, or a traction pad for residential or public aquatic use.

11. A polymer article having a micro-impacted first surface with a plurality of microfractures arranged in a random pattern, wherein the polymer is a polycarbonate or acrylic polymer, wherein the microfractures are formed from a plurality of discontinuities in the first surface, wherein the plurality of discontinuities extend into the article and create a plurality of respective edges, and wherein the first surface further is patterned with a plurality of geometric shapes, and wherein the article has a coefficient of friction (COF) of at least 0.6 when measured on the first surface, and wherein the COF is determined per ASTM F1677 or ASTM F1679, and wherein the microfracture first surface has a structure effective to allow for optical resolution of an image coupled to a second surface of the article of equal to or less than 1 mm.

12. The article of claim 11 wherein the first polymer surface is a structured surface.

13. The article of claim 11 wherein the structured surface has a shape selected from the group consisting of an random shape, a geometric shape, and an intersecting pattern.

14. The article of claim 11 wherein the microfractures comprise micro-ablations and micro-crevices.

15. The article of claim 14 wherein the article has a coefficient of friction (COF) of at least 0.65 when measured on the first surface.

16. A non-abrasive article comprising a micro-impacted first polymer surface having a plurality of discontinuities, wherein the plurality of discontinuities extend into the layer and create a plurality of respective edges, wherein the first polymer surface has a coefficient of friction (COF) of at least 0.6, wherein the first surface has a structure in which presence of water increases the COF of the first surface, wherein the polymer is a polycarbonate or acrylic polymer, and wherein the COF is determined per ASTM F1677 or ASTM F1679, and wherein the micro-impacted first surface has a structure effective to allow for optical resolution of an image coupled to a second surface of the article of equal to or less than 1 mm.

17. The article of claim 16 wherein the structure comprises a plurality of microfractures, and wherein the first polymer surface has an average depth of the microfractures of equal or less than 0.1 mm.

18. The article of claim 16 wherein the article is transparent and has a structure effective to allow for optical resolution of an image coupled to the second surface of equal or less than 0.5 mm.

* * * * *